United States Patent
Duggan et al.

(10) Patent No.: US 6,922,216 B2
(45) Date of Patent: Jul. 26, 2005

(54) MECHANICAL SYSTEM FOR ADJUSTING IMAGE CENTERING AND ROTATION IN PROJECTION TELEVISION APPARATUS

(75) Inventors: Scott Joseph Duggan, Indianapolis, IN (US); Darin Bradley Ritter, Indianapolis, IN (US)

(73) Assignee: Thomson Licensing S. A., Boulogne-Billancourt (FR)

( * ) Notice: Subject to any disclaimer, the term of this patent is extended or adjusted under 35 U.S.C. 154(b) by 434 days.

(21) Appl. No.: 10/121,202

(22) Filed: Apr. 12, 2002

(65) Prior Publication Data

US 2003/0193621 A1 Oct. 16, 2003

(51) Int. Cl.[7] .............................................. G02B 7/00
(52) U.S. Cl. ...................... 348/744; 348/785
(58) Field of Search ................................ 348/744, 745, 348/785, 787–790, 806, 825–831, 746, 751, 761, 766, 794, 836; 359/212; H04N 5/64, 5/645, 5/74

(56) References Cited

U.S. PATENT DOCUMENTS 6,709,114 B1 * 3/2004 Duggan et al. ............... 353/74

FOREIGN PATENT DOCUMENTS

| EP | 0 735 410 A2 | 10/1996 |
| EP | 0 939 548 A2 | 9/1999 |
| EP | 1 137 275 A2 | 9/2001 |
| JP | 408201938 A * | 8/1996 |

* cited by examiner

Primary Examiner—David E. Harvey
(74) Attorney, Agent, or Firm—Joseph S. Tripoli; Joseph J. Laks; Christine Johnson

(57) ABSTRACT

First (3), second (5) and third (7) eccentric cams, positioned in substantially the same plane, mate with corresponding first (9), second (11) and third (13) slots in a bracket (1). Rotation of the first cam (3) has the ability to move the bracket (1) in an X direction. Rotation of the second cam (5) has the ability to move the bracket (1) in a Y direction perpendicular to the X direction. Rotation of the third cam (7) has the ability to rotate the bracket (1) in a plane defined by said X and Y directions.

7 Claims, 4 Drawing Sheets

MECHANICAL SYSTEM FOR ADJUSTING IMAGE CENTERING AND ROTATION IN PROJECTION TELEVISION APPARATUS

DESCRIPTION OF RELATED ART

Many systems use electronic adjustment of image centering and rotation. This invention relates to projection television apparatus, and is particularly advantageous with liquid crystal display (LCD) projection systems. With LCD projectors, electronic adjustment of centering and rotation adversely impacts picture performance. For electronic centering, there must be extra pixels outside of the image area to accommodate image shift. Therefore, some of the pixels are unused and resolution is reduced. For electronic rotation of the image, there is a similar result of wasted pixels, as well as a digital "stair-stepping" effect that occurs when a horizontal or vertical line is rotated and mapped to a rectangular pixel array.

PROBLEM SOLVED

The projectors used in projection television apparatus must be properly adjusted in order to provide maximum picture accuracy. This invention allows a projector to be finely positioned such that the projected image is corrected to provide aiming and rotational accuracy.

SUMMARY OF THE INVENTION

This invention provides an adjuster for positioning an element in a projection television apparatus. The adjuster comprises a bracket that mounts the element. First, second and third eccentric cams, positioned in substantially the same plane, mate with first, second and third slots in the bracket. The first cam has the ability to move the bracket in an X direction. The second cam has the ability to move the bracket in a Y direction perpendicular to said X direction, and the third cam has the ability to rotate the bracket in a plane defined by the X and Y directions.

An advantageous feature of the invention is that at least one of the cams provides both an adjustment function and a hold-down function.

Another advantageous feature of the invention is that means prevent one of the cams from moving when another cam is being adjusted.

Another advantageous feature of the invention is that at least one cam has a flange and matches the thickness of the slotted bracket.

Another advantageous feature of the invention is that a mating part, rigidly coupled to a housing for said television apparatus, is rigidly coupled to an overhanging arm. The bracket is sandwiched between the overhanging arm and the mating part.

Another advantageous feature of the invention is that the overhanging arm has an interference hump bearing against the bracket.

Another advantageous feature of the invention is that a mating part, rigidly coupled to a housing for the television apparatus, is urged toward a cam by a compression spring.

Another advantageous feature of the invention is that the compression spring is a wavy washer.

DETAILED DESCRIPTION

Figure 1A:
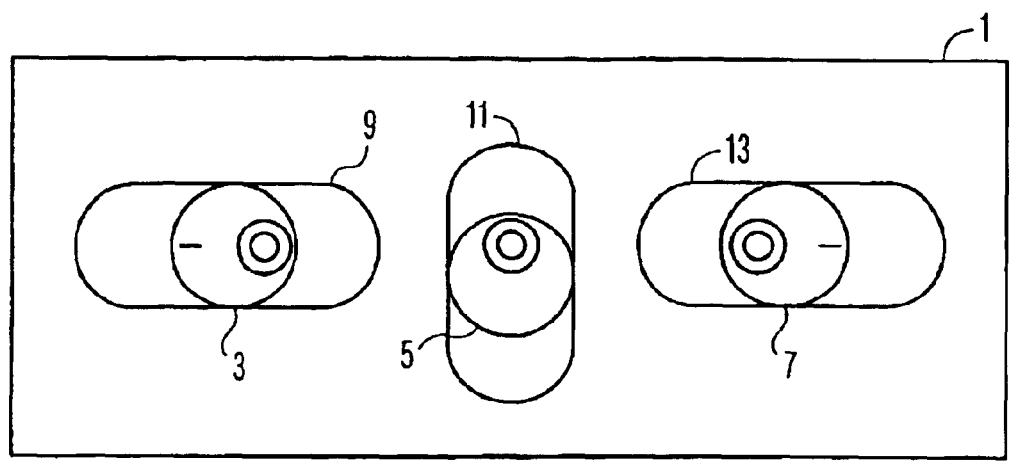
FIGS. 1a and 1b show the cam arrangement of the invention in two different positions.
Figure 1B:
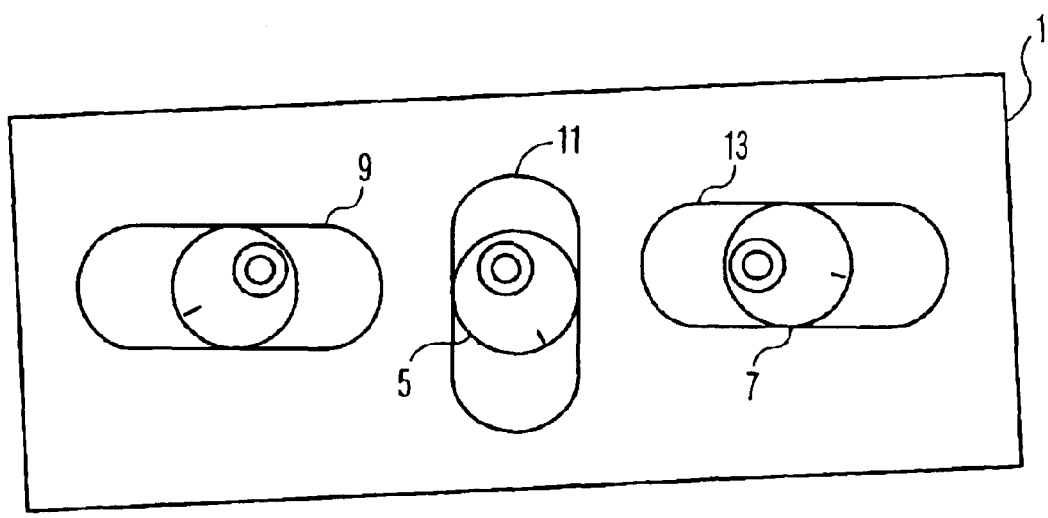

Referring to FIGS. 1a and 1b, the invention provides a slotted bracket 1 that mounts the projector, and an eccentric cam arrangement that allows the bracket to be positioned accurately over a limited range. By using three cams 3, 5, and 7, in three slots 9, 11 and 13, X and Y motion, as well as rotation, can be achieved.

FIG. 1a shows the cams in their nominal positions. Rotation of cam 5 produces horizontal motion of bracket 1 in an X direction. Rotation of cams 3 and 7 in the same direction produces vertical motion of bracket 1 in a Y direction. Differential rotation of cams 3 and 7 causes bracket 1 to rotate, as shown in FIG. 1b. Note that in FIG. 1b, cam 5 has been rotated by a small amount, which also translates bracket 1 in a horizontal direction.

Figure 2:
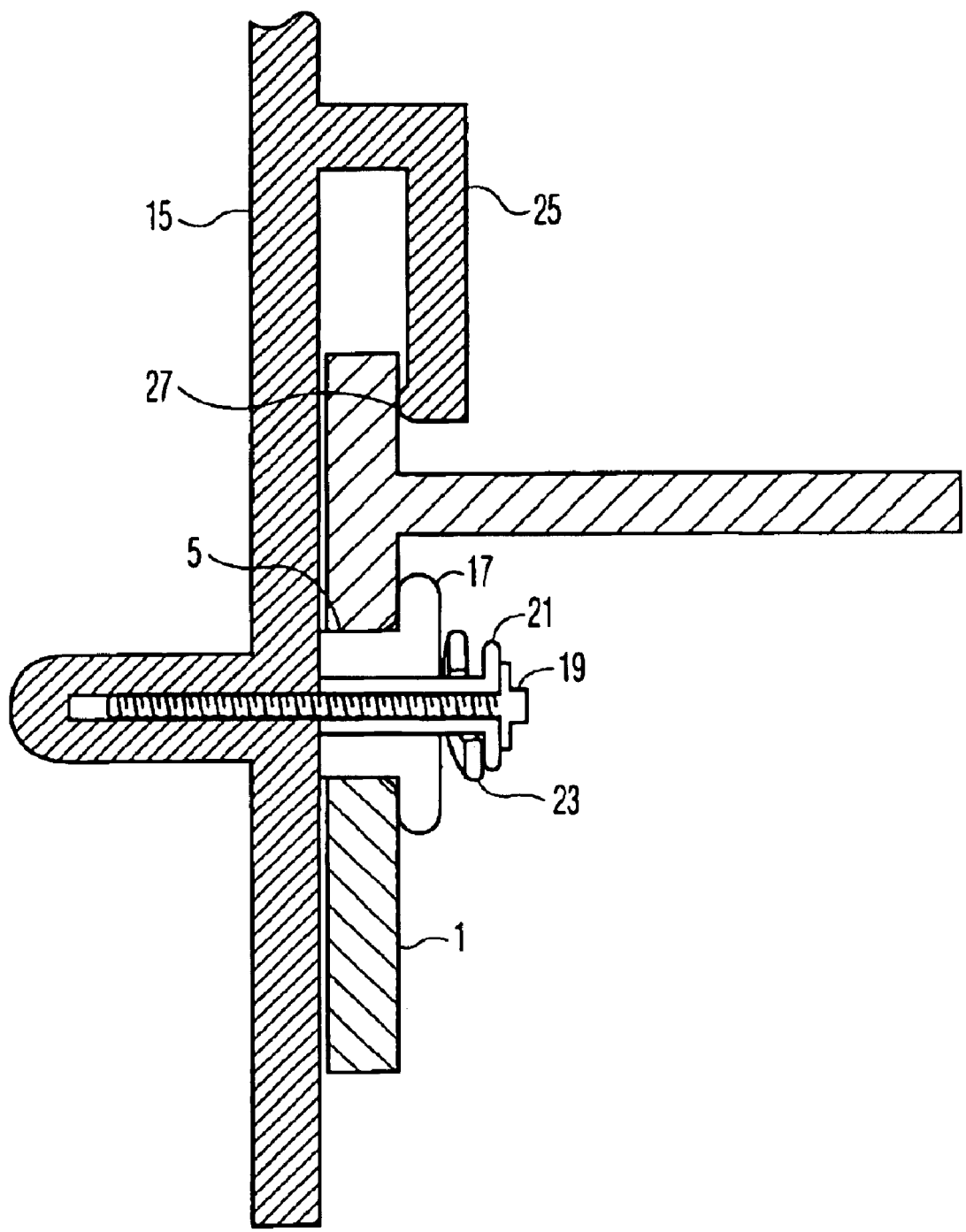
FIG. 2 is a cross section view of the inventive cam mechanism.
Figure 3A:
FIGS. 3a, 3b, 3c and 3d are views of a wavy washer used with the inventive cam mechanism.
Figure 3B:
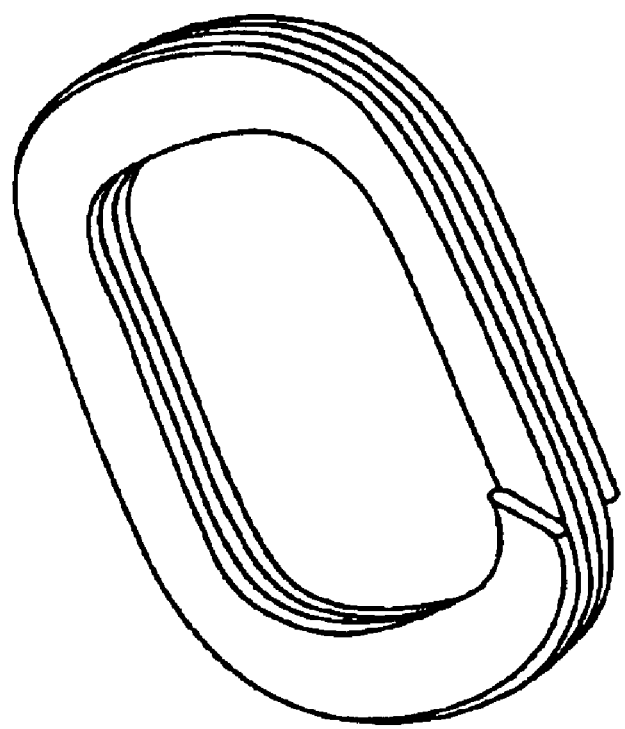
Figure 3C:
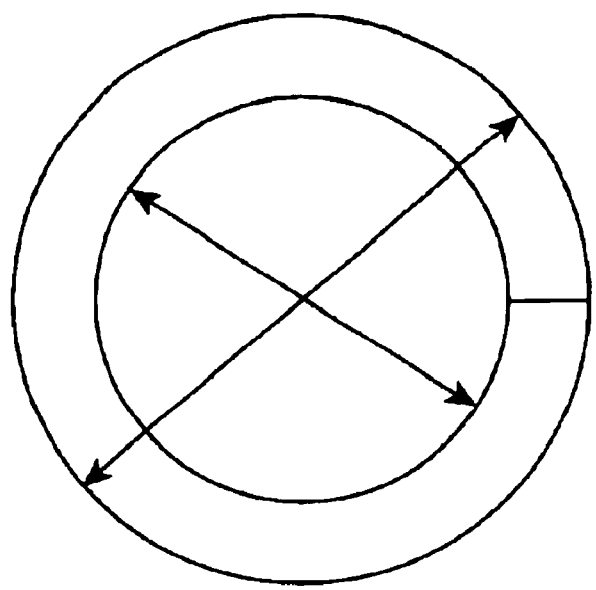
Figure 3D:
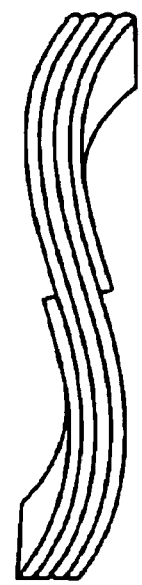

A feature of the invention comprises a cam serving double duty as both a hold-down function and an adjustment function. Referring to FIG. 2, mating part 15, which is rigidly coupled to a housing for the television apparatus, is held to bracket 1 by the cam arrangement. Only one of the three cams is shown in FIG. 2. However, the structure of the other cams is similar. Cam 5 has a flange 17 which holds bracket 1 to mating part 15. Screw 19 threads into mating part 15, through shoulder bushing 21, wavy washer spring 23 and cam 5. Because the thickness of cam 5 is matched to the thickness of bracket 1, flange 17 holds bracket 1 in frictional engagement with mating part 15, the amount of friction being determined by the pressure exerted by wavy washer spring 23.

Mating part 15 has an overhanging arm 25 which assists in keeping bracket 11 in contact with mating part 15. Overhanging arm 25 has an interference hump 27 which bears against bracket 1 without unduly increasing the friction therebetween.

Another feature of the invention is to prevent one cam from moving when another cam is being adjusted. Flange 17 causes bracket 1 to be frictionally engaged with mating part 15. When one cam is adjusted, the other cams maintain their positions by virtue of their frictional engagement with mating part 15. As a result, each cam can be adjusted with minimal motion of the other cams.

Preventing one cam from moving when another one is being adjusted is accomplished by using a screw 19, shoulder bushing 21 and a compression spring 23 to generate a clamp load between the cam and the mating part 15, such that a frictional force counteracts rotation. The amount of friction is selected such that a cam does not inadvertently turn too easily, but that it is not too difficult for a person to rotate a cam by hand with a simple tool.

A preferred embodiment uses an edge wound wavy spring washer 23, as shown in FIGS. 3a, 3b, 3c and 3d, to generate the high compression load needed between the cam and the mating part. Such an arrangement is able to fit in a compact space.

A benefit of using a wavy washer as the spring 23, instead of a helical wire spring, is the inherent "rounded" contact surfaces between the spring and the mating parts, shoulder bushing 21 and cam 5. By having these rounded contact surfaces, the amount of digging and galling caused by the spring to the mating parts is minimized. This allows the spring to directly contact a plastic cam without the added cost or bulk of a metal washer. The wavy washer spring also does not have the problem of "winding" and "unwinding" as the cams are turned. Such winding and unwinding tends to undesirably add to the variability of the rotary force needed to turn the cam

What is claimed is:

1. An adjuster for positioning an element in a projection television apparatus, said adjuster comprising:
   a bracket that mounts said element;
   first, second and third eccentric cams positioned in substantially the same plane:
   first, second and third slots in said bracket each mated with a respective one of said cams;
   rotation of said second cam having the ability to move said bracket in an X direction;
   rotation of said first and third cams having the ability to move said bracket in a Y direction perpendicular to said X direction; and
   rotation of said first and third cam also having the ability to rotate said bracket in a plane defined by said X and Y directions,
   one of said cams providing both an adjustment function and a hold-down function.

2. An adjuster as in claim 1, comprising:
   means for preventing one of said cams from moving when another cam is being adjusted.

3. An adjuster as in claim 1 in which one cam has a flange, and in which the thickness of said cam matches the thickness of said slotted bracket.

4. An adjuster as in claim 1, comprising:
   a mating part rigidly coupled to a housing for said television apparatus;
   an overhanging arm rigidly coupled to said mating part;
   said bracket being sandwiched between said overhanging arm and said mating part.

5. An adjuster as in claim 4, in which said overhanging arm has an interference hump bearing against said bracket.

6. An adjuster as in claim 1, comprising:
   a mating part rigidly coupled to a housing for said television apparatus; and
   a compression spring positioned to urge a cam toward said mating part.

7. An adjuster as in claim 6, in which said compression spring is a wavy washer.

* * * * *